July 5, 1960

E. C. WARRICK ET AL

2,943,631

FARE BOX

Filed Oct. 15, 1953

INVENTORS
EDWARD C. WARRICK
DONALD L. BROWN
BY
Strauch, Nolan & Diggins
ATTORNEYS

July 5, 1960  E. C. WARRICK ET AL  2,943,631
FARE BOX

Filed Oct. 15, 1953  9 Sheets-Sheet 2

INVENTORS
EDWARD C. WARRICK
DONALD L. BROWN
BY
Strauch, Nolan & Diggins
ATTORNEYS July 5, 1960

E. C. WARRICK ET AL

2,943,631

FARE BOX

Filed Oct. 15, 1953

INVENTORS
EDWARD C. WARRICK
DONALD L. BROWN
BY
Strauch, Nolan + Diggins
ATTORNEYS July 5, 1960

E. C. WARRICK ET AL 2,943,631

FARE BOX

Filed Oct. 15, 1953

INVENTORS
EDWARD C. WARRICK
BY DONALD L. BROWN

Strauch, Nolan & Diggins
ATTORNEYS

United States Patent Office 2,943,631
Patented July 5, 1960

2,943,631

FARE BOX

Edward C. Warrick, Pittsburgh, Pa., and Donald L. Brown, Bellefontaine, Ohio, assignors to Rockwell Manufacturing Company, Pittsburgh, Pa., a corporation of Pennsylvania Filed Oct. 15, 1953, Ser. No. 386,251

15 Claims. (Cl. 133—3)

This invention relates to coin sorting and registering devices of the type used on street cars, buses and the like, ordinarily called fare boxes.

Such fare boxes are provided to speed fare collection, to record fares collected and to check dishonesty, and are of several types, ranging from a simple lock box wherein deposited coins fall into a locked box out of reach of the operator to the substantially fully automatic type shown in United States Patent No. 2,685,406 and United States Patent No. 2,773,640.

The fully automatic fare boxes are of two general types. In the type shown in United States Patent No. 2,685,406, the coins after registration are made available to the operator by sorting and distribution in a convenient change maker. In the type shown in United States Patent No. 2,773,640, the coins after registration are dropped into a vault in the bottom of the farebox and are thereby made completely in accessible to the operator.

In both types of automatic boxes, the coins are dropped into an inspection receptacle such as is shown in United States Patent No. 2,685,406. By means of a plunger actuated by the operator, the coins are dumped into a singling and sorting device. The mechannism within the fare box is driven by an electric motor started in response to the action of the coins being dropped into the singling device. The motor will continue running until all of the coins dropped into the singling device have been singled and sorted after which the motor will stop until its circuit is again closed in response to the action of coins being dropped into the singling and sorting device.

Before leaving the singling and sorting mechanism, the coins are presented to a gauging mechanism which gauges the coins according to their diameter. The gauging mechanism controls the operation of a system of mechanical movements which system actuates a number of counters to register the fares dropped into the boxes, as reflected by the gauging mechanism. This system of mechanical movements is commonly referred to as the cyclometer.

After the coins have been presented to the gauging mechanism, they are droped into a chute which guides the coins either to a sorter and change maker if the fare box is of the type shown in United States Patent No. 2,685,406, or to a vault if the box is of the type shown in United States Patent No. 2,773,640.

The present invention relates to improvements in the coin singling mechanism. I have shown and described the present invention in connection with a box of the type shown in the latter application, however, it is to be understood that the invention may be used with either type of fare box. The fare boxes of the prior art have been found to be subject to certain disadvantages in operation particularly in their vulnerability to deliberate jamming by use of bent token, coins and slugs and by imposing excessive coin loads on the mechanism in order to disable the box to permit the operator to make direct fare collections without registration.

It is accordingly a primary object of my invention to provide a new and improved simplified lower cost motor driven and manually controlled fare box which is less subject to jamming than the prior boxes.

Another object is the provision of a novel rejection mechanism that prevents the coin singling mechanism from feeding bent or mutilated coins, buttons, or other foreign articles to the gauging mechanism which, if fed to said gauging mechanism, would jam it.

Another object is the provision of a novel defective coin dump to permit the deposit of defective coins and debris in an auxiliary receptacle.

A further object is the provision of a novel interlock to insure energization of the motor circuit whenever coins are present in the coin singling device.

A still further object of invention is the provision of an interlock which renders the drive motor inoperative as long as the defective coin dump is displaced from its normal position.

Other objects will be apparent from the following description and the appended claims.

Figures 1, 6, 7, 8:
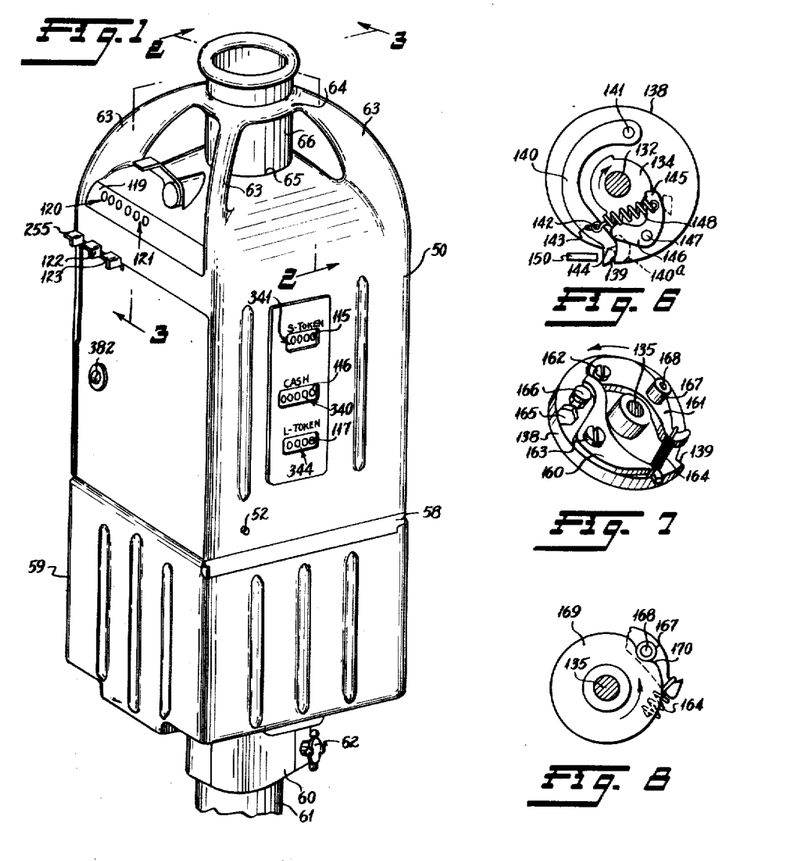
Figure 1 is a perspective view of the preferred fare box.
Figure 6 is a bottom plan view of the clutch assembly of Figure 5 showing a disengageable ratchet drive.
Figure 7 is a perspective view looking toward the top side of the driving elements of a preferred overload clutch.
Figure 8 is a top plan view of the driven element that cooperates with the driving assembly of Figure 7.
Figure 2:
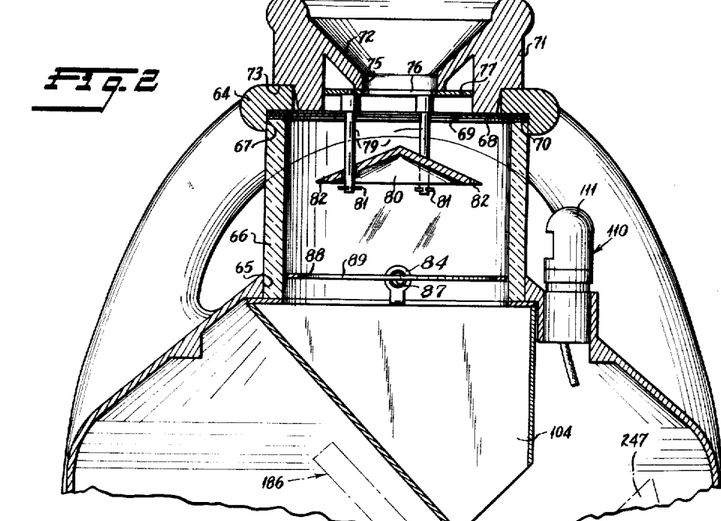
Figure 2 is a side elevation along the plane defined by the lines 2—2 in Figure 1 in section, looking from the direction of the arrows.
Figure 3:
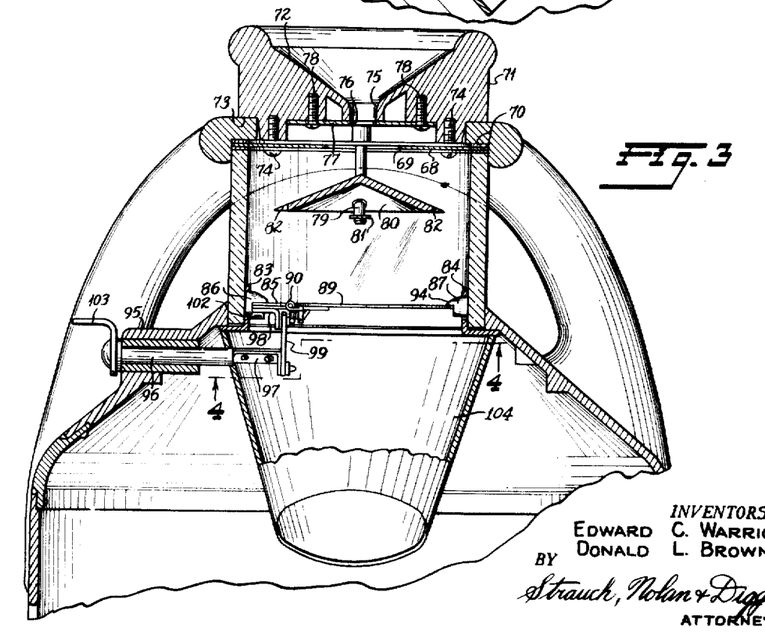
Figure 3 is a side elevation in section taken along the plane defined by the lines 3—3 in Figure 1 looking from the direction of the arrows.

Referring to Figures 1, 2 and 3, the fare box includes an exterior cabinet 50 which encloses the internal mechanism. The cabinet is secured to the internal frame 51

(Figure 5) by a pair of outwardly spring biased pins 52, one of which is shown in Figure 1, that pass through aligned openings in opposite sides of the cabinet near the forward bottom portion thereof. At the lower side (Figure 16) a rod 53 passes completely through opposite side walls of the cabinet and through a series of aligned holes in the frame 51. On the inside of the cabinet (Figure 16) is a key actuated latch arm 55 which is rotatable by the key to a locking position where a notch in the lower left end of the arm 55 engages a reduced section in the rod 53 thereby preventing removal of the rod 53 unless a key is inserted in the lock 57 to turn the arm 55 clockwise. Locking of the cabinet is accordingly accomplished by turning the key counterclockwise.

Referring to Figure 1, the bottom of the frame 51 is secured to a base 58 which in turn is secured by any suitable means to a safe 59. The safe 59 receives a removable sliding drawer which constitutes a vault for the reception of coins and fares. The means by which the drawer is locked into the safe 59 against unauthorized removal is the subject matter of Serial No. 283,084 and therefore need not be described in the present application. Secured to the bottom of the safe 59 is a cylindrical boss 60 which receives a post or pedestal 61 that supports the fare box at the proper height above the floor. A hand screw is indicated at 62 for actuating a clamping mechanism (not shown) to secure the fare box to the pedestal 61.

The cabinet is rectangular in horizontal cross-section, and at its upper end (Figures 1, 2 and 3), four similar handles 63 protrude upwardly and inwardly to where they meet in an integral central ring 64. The top wall of the cabinet also slopes inwardly and upwardly toward a central round opening 65. This opening forms a guide for a cylindrical window 66 that at its upper end is received in an annular channel 67 in the central ring 64. Between the top of channel 67 and the top of window 66 is an annular plate 68 with a central opening 69 and a gasket 70 (Figure 3). A coin receiving member 71 with a downwardly and inwardly flaring wall 72 and an annular shoulder 73 is secured by means of screws 74 to the plate 68 in such a manner so as to clamp a portion of the annular ring 64 between the disc and shoulder. The walls 72 slope down and end in a slot 75 which slot coincides with a similar slot 76 in a plate 77 which is secured to the bottom of the coin receiving member 71 by means of screws 78.

Depending from plate 77 are three equally spaced posts 79 upon which is loosely mounted a conical shaped baffle 80. Snap rings 81 prevent the baffle 80 from dropping off the posts 79. The edge of the baffle 80 has teeth 82 cut into it for a purpose to be described later.

Secured to the cabinet 50 in diametrically opposed relation within the window 66 are two bearings 83 and 84. Integrally formed on an annular disc 85 are two diametrically opposed pivot points 86 and 87, by means of which the plate 85 is mounted in bearings 83 and 84 for limited rocking motion about the axis of pivot points 86 and 87. The plate 85 has a central opening 88 (Figure 4) which is closed by a trap door 89. The trap door 89 is hinged to the annular plate 85 by means of hinge 90. Pins 91 and 92 are respectively formed on the trap door 89 and plate 85. A spring 93 is mounted between the pins 91 and 92 to bias the trap door in its normal horizontal position against the lip 94 (Figure 3), formed by the tail of pivot point 87 extending into central opening 88 of plate 85.

Figure 4:
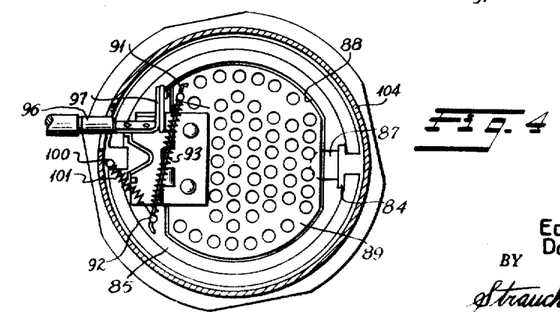
Figure 4 is a bottom view of the tilting disc and trapdoor mechanism viewed in the direction shown by the arrows 4—4 of Figure 3.

Integrally formed on one of the sloping sides of the cabinet 50 is a boss 95 in which a shaft 96 is journalled for rotary motion. An L-shaped bracket 97 is secured to the end of shaft 96 (Figure 4). Similarly, another L-shaped bracket 98 is rigidly secured to the underside of the plate 85 (Figure 3). An arm 99 has one end pivotally connected to bracket 97 and the other end pivotally connected to the bracket 98. A pin 100 is secured in a fixed position relative to the cabinet 50 and one end of a spring 101 is connected thereto, the other end of which is connected to the pin 92. In its normal horizontal position, the underside plate 85 abuts against stop lug 102 which is formed integral with the lower portion of bearing 83. As viewed from Figure 2, when the plate 85 is in its normal horizontal position, the lug 102 will prevent further counterclockwise rotation of the said plate but will permit clockwise rotation thereof within the limits imposed by the linkage system composed of brackets 97 and 98 and arm 99. The spring 101 therefore biases the plate 85 in its normal horizontal position against the lug 102 and tends to resist counterclockwise rotation of the plate as viewed in Figure 2.

When the coins or fares are dropped by passengers into the coin receiving member 72, they are directed through the slots 75 and 76 and opening 69 on to the baffle 80 from which they drop onto the plate 85 and trap door 89. If the fare box is tipped upside down in an effort to retrieve the coins laying on the plate 85 and trap door 89, the baffle 80 being loosely mounted on posts 79, will drop down to close the opening 69 and the coins will drop into the inside of the baffle 80, thereby preventing unauthorized removal of the coins. The teeth 82 tend to prevent the withdrawal of any stick or other similar article inserted into the interior of the glass window for the purposes of removing coins.

When a number of coins have accumulated on the plate 85 and trap door 89, the plate and trap door can be tilted by means of a lever 103. Rotation of the shaft 96 tilts the plate 85 and trap door 89 about the axis of pivot points 86 and 87 by means of the linkage system of brackets 97 and 98 and arm 99, thereby allowing the coins to drop into the chute 104 which funnels them into the coin singling mechanism, operation of which will be subsequently described herein. The trap door 89 is provided to prevent an undue amount of coins from accumulating in the event the operator forgets or neglects to manually dump the coins by depressing the lever 103. As previously described, the trap door opens downwardly but is biased to a closed horizontal position against the lip 94 by the action of spring 93. As the coins accumulate, the spring 93 will only sustain a given predetermined weight which, if exceeded, will overcome the force of spring 93, thereby automatically opening the trap door 89, allowing the coins to drop into the chute 104.

In order to prevent the entrance of tokens or coins too large in diameter to be handled by the fare box, the length of slot 76 in disc 77 is predetermined by the diameter of the largest coin intended to be handled by the fare box. Thus, if the box is not intended to handle anything larger than quarters, the slot 76 will be of such a length so as to allow the passage of quarters any anything of lesser diameter but will obstruct any coin of a larger diameter, thus permitting its removal by hand.

As described in the copending application Serial No. 186,054 dated September 21, 1950, by Fount F. Daugherty for Fare Box with Grab Handles the four equally spaced handles 63 provide grips for passengers who are standing or for those who may be passing the fare box when the vehicle starts.

A light bulb 110 (Figure 2) mounted within a reflector 111 secured to the top portion of the cabinet 50 illuminates the tiltable plates 85 and 89 and any coins that are resting thereon.

Figure 1 shows three windows 115, 116 and 117 in the side of the cabinet 50, through which are visible the numeral wheels of three counter assemblies indicated generally by the numerals 341, 340 and 344. These counter assemblies are actuated automatically by the fare box, as will be explained, to register respectively the totals of small tokens, coins and large tokens. A plate 118 carries legends indicating the specific items registered by the counter assemblies.

The front of the cabinet 50 has an elongated window 119 through which are visible two counter assemblies 120 and 121 (see Figure 1) which are selectively actuated by the manual depression of either of a pair of levers 122 and 123 protruding from the front of the cabinet. These counters and actuators are of any conventional type wherein the single depression of lever actuates its respective counter to add a single numeral to the previous total.

The motor and drive shaft

The fare box is powered by an electric motor 130 (Figure 5) suitably secured to the bottom of the internal frame 51. The motor has reduction gear box 131 which journals the lower end of a vertical output shaft 132 (Figure 6) which passes through a housing 133 and carries adjacent its upper end a triple toothed circular rathcet 134 (Figure 6). A driven shaft 135 is mounted coaxially above the motor output shaft 132, being journalled in a pair of horizontal internal frame members 136 and 137. The driven shaft 135 is releasably connected to the motor shaft 132 by a clutch mechanism now to be described.

Secured to the lower end of the driven shaft 135, where it adjoins the upper end of shaft 132 and the ratchet 134, is a plate 138, best shown in Figures 6 and 7, having a periphery that includes on radial lip or notch 139 forming a stop. A semi-circularly curved plate 140 (Figure 6) is secured to the bottom of the plate 138 by a pivot pin 141 so that the curved plate lies against the under surface of plate 138 and can rotate about pin 141. This rotational movement is limited by a pin 142 fixed to the upper plate 138 and protruding through a short slot 143 in the pivoted plate 140. The free end of pivoted plate 140 is thereby limited to a movement between its full line position shown in Figure 6 and the dotted line position shown at 140a. The pivoted plate 140 has at its free end a radial lip 144, which when the plate 140 is in its dotted line position 140a, is coplanar with the radial lip 139 of the plate 138.

A bell-crank shaped pawl having legs 145 and 146 is pivotally secured to the bottom of plate 138 by a pin 147. A tension spring 148, secured to the pin 142 and to a pin 149 on the pawl, urges the pawl counterclockwise as viewed in Figure 6 so that the outer end of its leg 145 is in the path of the teeth on the ratchet 134. The spring 148 is sufficiently strong to cause the leg 146 of the pawl to exert a camming action on the free end portion of plate 140 to normally maintain the plate 140 in its full line position shown in Figure 6. It will be apparent that under these conditions there is a positive drive connection between the motor shaft 132 and the plate 138. This drive can be disconnected by rotating the plate 140 counterclockwise as viewed in Figure 6 so that by a camming action it overcomes the action of the spring 148 and rotates the pawl clockwise, thereby moving its leg 145 to the dotted line position 145a where it is out of the path of the teeth on the ratchet 134.

Figure 5:
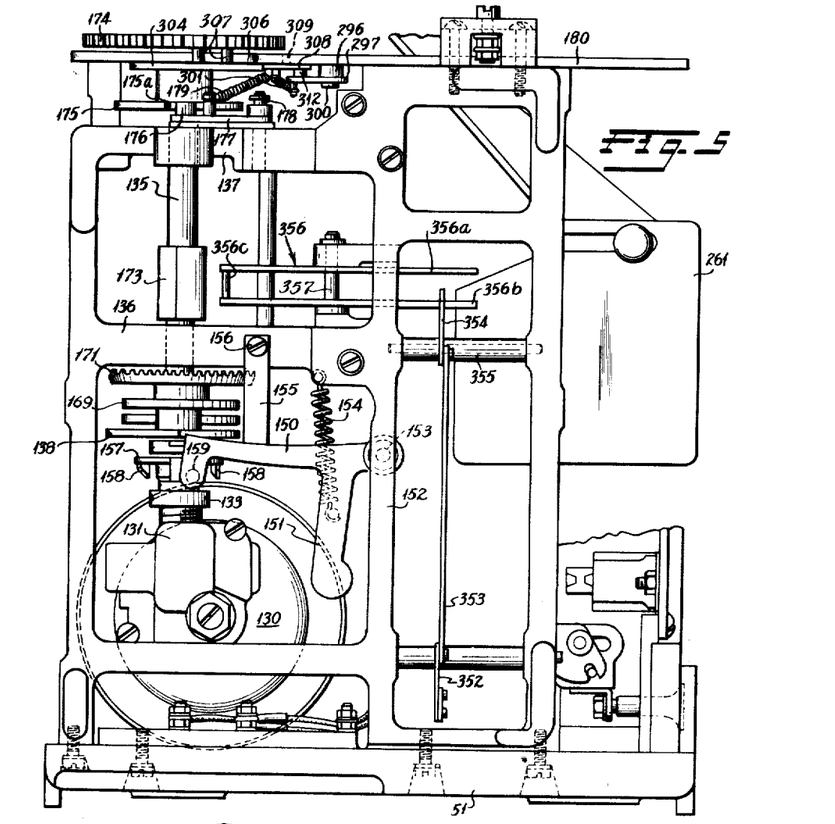
Figure 5 is a side elevation of the box with the cabinet removed, as viewed from the right in Figure 3.

Referring to Figure 5 a bell crank having legs 150 and 151 is pivotally secured to a member 152 of the internal frame by a pivot 153. A tension spring 154 urges the bell crank clockwise as viewed in Figure 5, against a stop member 155 secured to the frame as by a screw 156. As shown in Figure 6, the end of the crank arm 150 lies in a vertical plane in the path of the radial lip 144 on curved plate 140 and the radial lip 139 or stop on the plate 138, when the crank arm 150 is in the fully raised position shown in Figure 6. Thus, assuming that the ratchet and pawl are in driving engagement, in their clockwise rotation as viewed in Figure 6, first the lip 144 will hit the arm 150 to disengage the ratchet and pawl mechanism and then the lip or stop 139 on the plate 138 will hit the arm 150, thus stopping the plate and entirely discontinuing the transfer of power to the driven elements of the fare box, allowing the motor to coast to a stop if it has been deenergized at the same time.

The motor shaft 132 has affixed thereto for rotation therewith a disc 157 (Figure 5) having a series of three cams 158 depending downwardly from its periphery. The bell crank arm 150 has a pin 159 protruding therefrom, which when the arm 150 is in the raised position of Figure 15, lies in the path of the cams 158. In Figure 5 one of the cams is shown about to engage the pin 159. Upon energization of the motor 130 rotation of the cam 158 will depress bell crank arm 150 against the action of spring 154 and the arm 150 will release the lips 144 and 139. Spring 148 will thereupon engage the pawl leg 145 with the ratchet 134 so that the plate 138 will be positively driven through one revolution, whereupon the bell crank arm 150 will again disengage the positive ratchet and pawl clutch mechanism.

Figures 7 and 8 show an overload release clutch mechanism which prevents damage to the machine in the event of a jam therein. In Figure 7 is shown a pair of curved lever arms 160 and 161 pivotally secured to the top of the plate 138 by a pair of screws 162 and 163. A tension spring 164 urges their free ends together. Counterclockwise rotation of lever 160 is limited by a stop screw 165 passing through a stud 166 fixed to the plate 138. The other lever 161 carries a roller 167 free to rotate on a pin 168. The roller 167 bears against the periphery of a cam disc 169 mounted above the mechanism shown in Figure 7 and fixedly secured to the driven shaft 135. The roller 167 is normally seated in a depression 170 in the periphery, being resiliently held therein by the spring 164, with a force sufficient to transmit normal forces to the disc 169. In the event of a jam in the machine, the roller will merely ride up out of the depression 170, thereby ceasing to transmit rotation. The roller can circle the plate 169, riding into and out of the depression 170 thereby ceasing to transmit rotation until the motor is deenergized.

Figure 9:
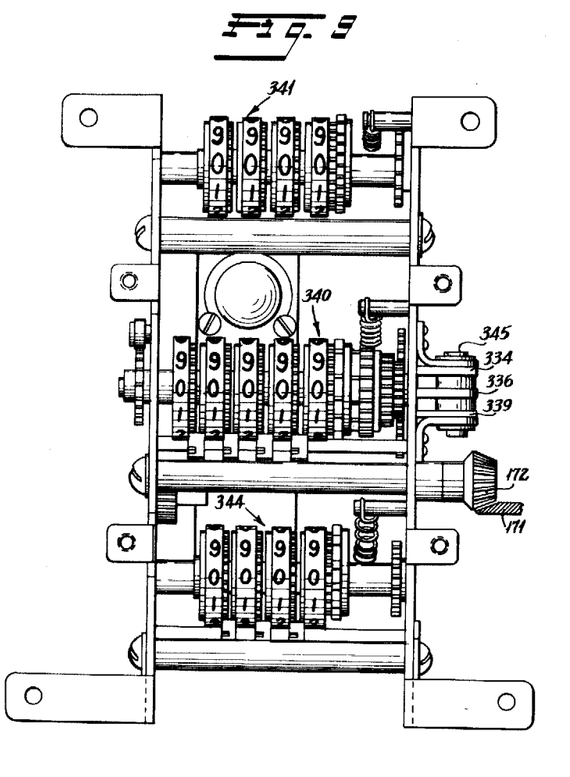
Figure 9 is a front view of the counter assembly.
Figure 20:
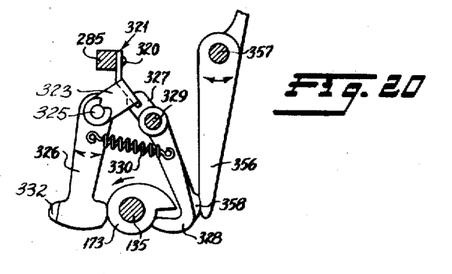
Figure 20 is a top view of a cam showing its profile along with the various levers it actuates.

Above the cam disc 169 is fixedly secured to the shaft 135 a bevel gear 171 which drives the coin and token counter mechanism through a bevel pinion 172 (Figure 9). This counter mechanism will be described later. Secured to the shaft 135 (Figure 5) for rotation therewith, above the frame member 136, is an elongated cam 173 having a profile as shown in Figure 20 and a function to be described later.

Suitably affixed to the top of the driven shaft 135 for rotation therewith is a gear 174. Secured to the driven shaft 135 below the gear 174, but above the frame member 137 is a plate cam 175. A cam follower 176 is carried by a lever 177 pivoted to the internal frame 51 by a pin 178 and urged clockwise by a tension spring 179. The cam 175 has a depression 175a which by means of the cam follower 176 and spring 179 resiliently holds the shaft 135 in such position that the system of cams, clutches and gears just described and known generally as the cyclometer is in its zero position when the motor 131 is de-energized, that is the position where all elements are in condition for the initiation of a cycle. The follower 176 thus assists in holding the driven shaft 135 in the position that it occupies before a rotation cycle or series of cycles.

Figure 10:
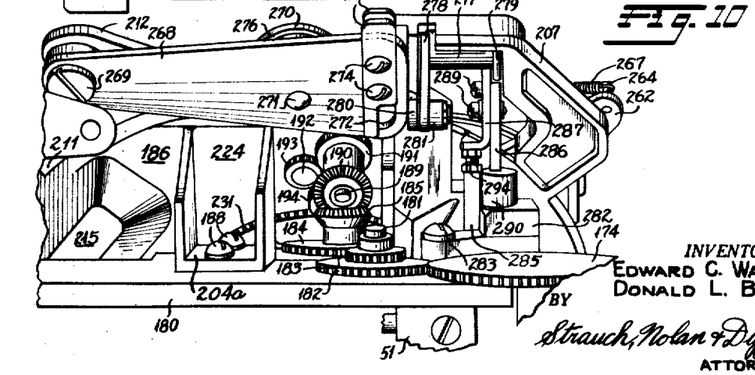
Figure 10 is an elevation view of the rear of coin singling mechanism showing in detail the drive and coin gauging elements.
Figure 11:
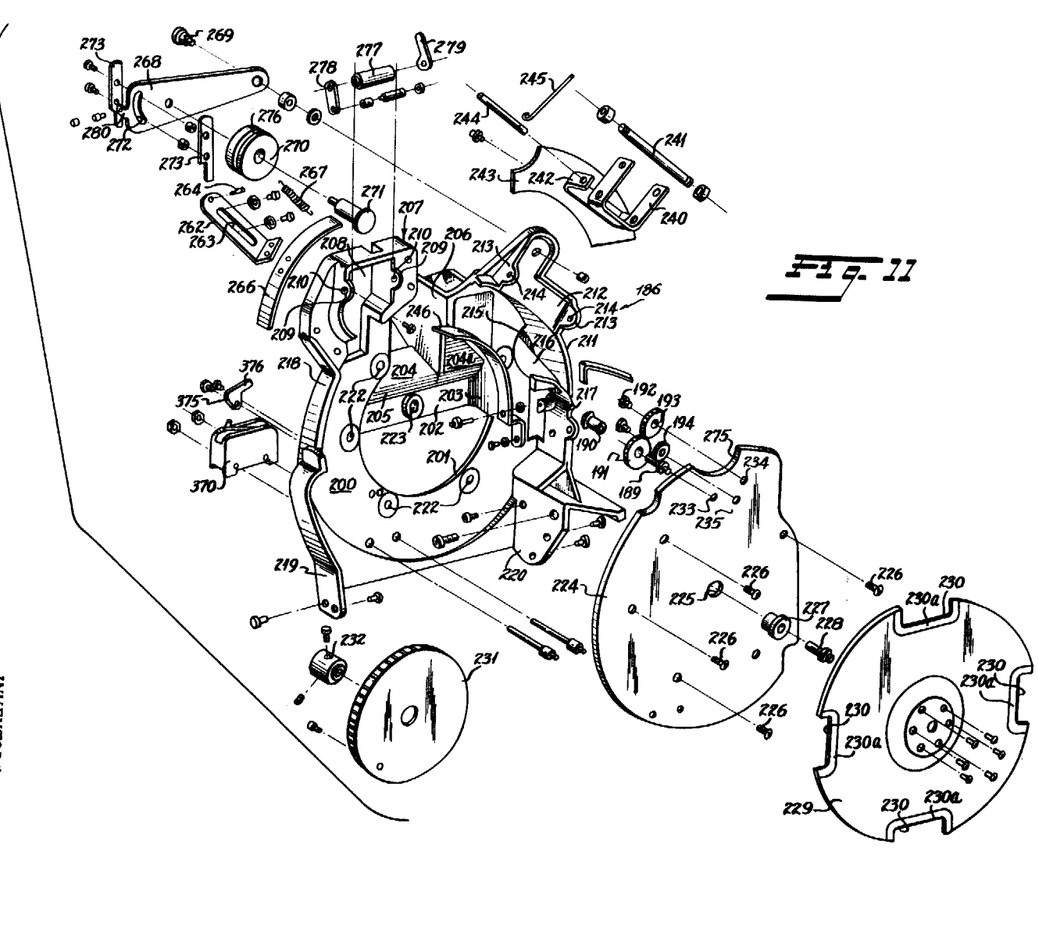
Figure 11 is a perspective view of the coin singling mechanism showing the base plate, disc plate, pick up disc and various drive gear in exploded relationship.
Figures 12, 21:
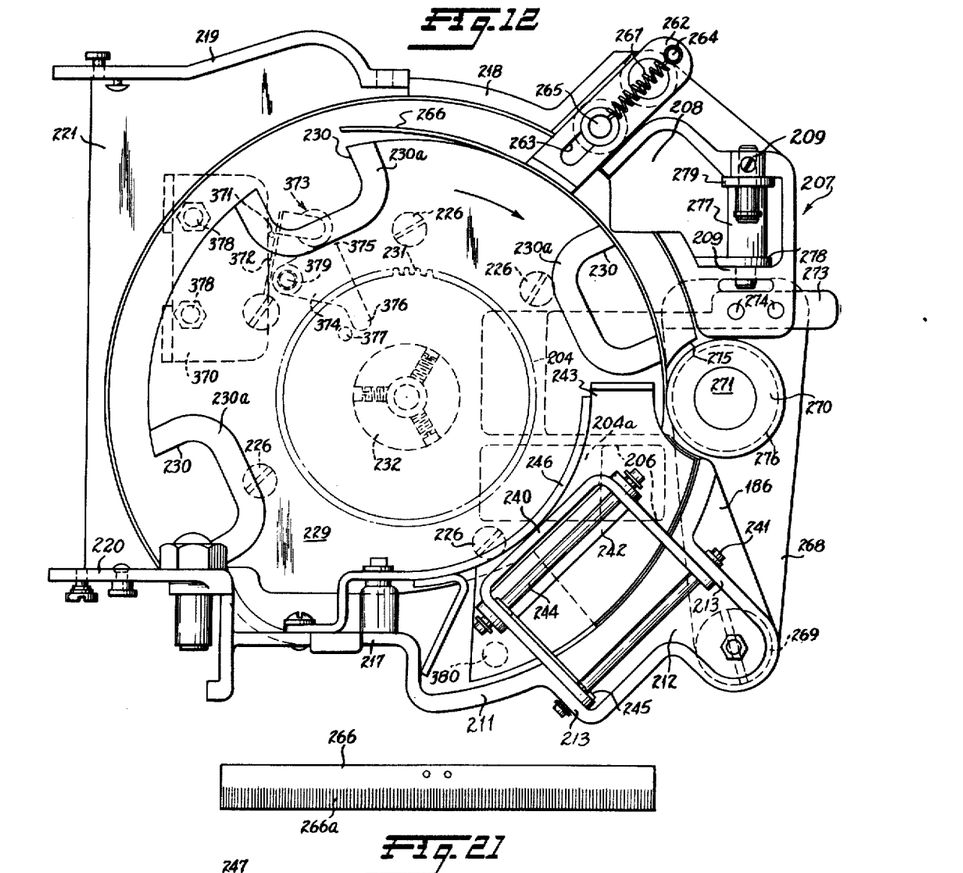
Figure 12 is a plan of the coin singling mechanism.
Figure 21 is a developed plan view of the coin rejector.

As best shown in Figures 10, 11, 12 and 18, an inclined base plate 186 is mounted in the fare box on an incline with respect to the top plate 180. The plate 186 is a base for and holds the coin singling mechanism now to be described. Figure 12 shows a plan view of the base plate and coin singling mechanism while Figure 11 is an exploded view of the base plate and the several components which make up the coin singling mechanism. The base plate 186 is made up of a generally annular disc portion 200 which has a central opening 201. A bar 202 extends diametrically across the central opening 201 and is offset from the plane of the disc portion 200, being connected to the disc portion by means of walls 203. A transverse wall portion 204 and 204a intersects with an inclined wall 205 which leads up from the bar 202.

Vertical walls 206 lead back from the intersection of walls 204 and 204a and 205 and provide means to secure the base plate to the top plate 180 of the inner frame 51 as will be described hereinafter. Extending from one side of the annular disc portion 200 is a frame portion denoted generally by the numeral 207, with an opening 208 therein. Adjacent to opposite sides of the opening 208 are ears 209 with coaxial holes 210 bored therein. It should be noted that the space between the walls 206 is open and that the space between the walls 206 and frame portion 207 is likewise open. Extending around a portion of the periphery of the disc portion 200 for approximately one-quarter of its circumference and perpendicular thereto is another wall 211. Extending from wall 211 in a plane parallel to the plane of disc portion 200 is another wall 212 which has upright ears 213. Coaxial holes 214 are bored in ears 213.

Adjacent to the wall 211, the disc portion 200 is formed with a shaped recess which with wall 211 forms a coin slot 215 for passing the coins from the coin gauging mechanism to the coin chute as will be described. The curved inner face 216 of coin slot 215 extends at one side of the cam slot to a wall 217 which is adjacent to and slightly inwardly offset from wall 211 to provide a continuation of the side wall of coin slot 215.

Diametrically opposite from the coin slot 215 is a side wall 218 which extends into a curved wall 219. Extending between a wall 220 and curved wall 219 is a squared portion 221 which is slightly raised from the disc portion 200. Five unequally spaced holes 222 are drilled into disc portion 200 immediately adjacent to central opening 201 for a purpose which will presently be described. A bore 223 extends through the bar 202 at a point midway between the walls 203 and coaxial with the center point of central opening 201. It is to be understood that the walls and portions of base plate 186, as described immediately above, all combine to make up the complete base plate and are all cast integral to make up one single casting.

A disc plate 224 with a central opening 225 coaxial with bore 223 in base plate 186 is rigidly secured to disc portion 200 by means of screws 226 which are threaded into holes 222. A bushing 227 is received within coaxial bores 225 and 223 to provide a bearing for shaft 228.

Secured to one end of shaft 228 by any suitable means (not shown) is a pick-up disc 229. As shown in Figures 11 and 12 the pick-up disc 229 has four equally spaced recesses 230 in its periphery.

In the area surrounding the recesses 230 the top surface of the disc slopes down to the edge of recesses 230 as shown at 230a. The edges of the recesses are therefore somewhat thinner in cross-section than is the rest of the pick-up disc. Spur gear 231 is rigidly mounted on shaft 228 by means of hub 232 to the rear of and closely adjacent to disc plate 224.

Received in a hole 233 in disc plate 224 and projecting rearwardly thereof is a stationary shaft 189 upon which bevel gear 190 and spur gear 191 (Figures 10 and 11) are rotatably mounted. The two gears 190, 191 are press fitted together for unitary rotation. A pivot pin 192, press fitted into hole 234, rotatably journals gear 193. Gear 193 meshes with and is driven by gear 191, and in turn meshes with and drives gear 194 which is mounted for rotation by means of a pivot pin press fitted into hole 235. Gear 194 meshes with and drives gear 231.

In assembly, the gears are first mounted on the rear side of disc plate 224 so that gear 191 drives gear 193, which drives gear 194, which in turn drives gear 231, rigidly mounted on shaft 228 extending through bushing 227. Plate 224 is then secured to the base plate 186, by means of screws 226 which are threaded into tapped bores 222. In such assembled position gear 231 is received into central opening 201 of base plate 186 in such a position that a segment thereof projects above the wall 204 (see Figure 10), and the gear train made up of gears 190, 191, 193 and 194 extend into the opening between the walls 206 and frame portion 207 of base plate 186.

Referring particularly to Figure 10 shown there is the upper portion of the inner frame 51 and the drive train from the cyclometer to the coin singling mechanism. A top plate 180 is secured to the top of the inner frame 51 by means of screws (not shown) or any other suitable means. Gears 182 and 183 are fixed relative to each other and are journaled for rotation together on post 181 which is rigidly mounted in an upright position on plate 180. Spur gear 184 and a bevel gear 185 are journaled for unitary rotation on a post (not shown) which is similar to post 181 and fixed on plate 180. Gear 174 meshes with and drives gear 182, while gear 183 meshes with and drives gear 184.

Figure 18:
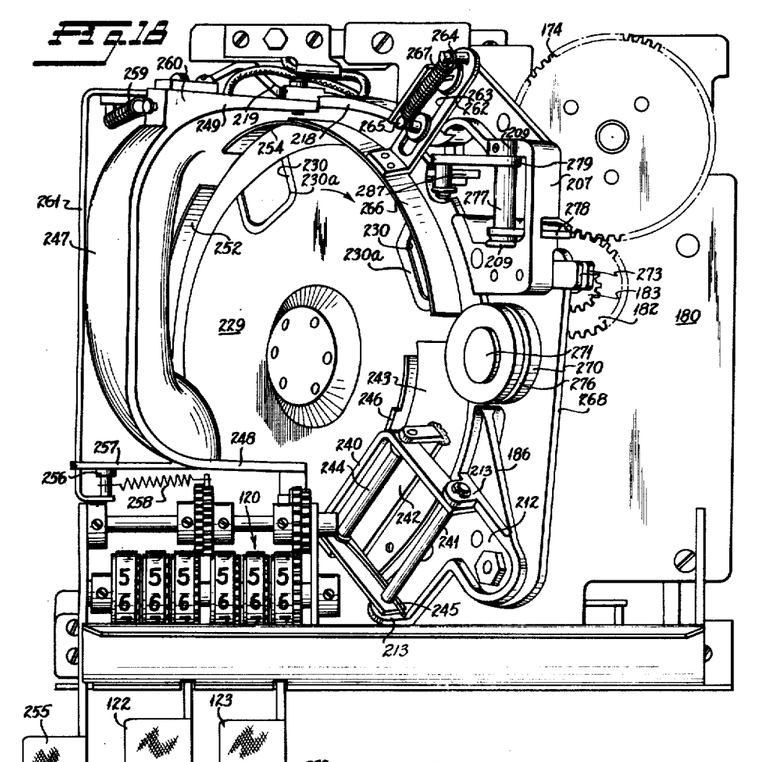
Figure 18 is a top view of the box with the cabinet removed and showing in detail the coin singling mechanism.

As best shown in Figures 10 and 18 the base plate 186 is rigidly mounted in the fare box at an angle to the top plate 180 by means of screws 188 which extend through lateral wall 204a and which are threaded into tapped holes in top plate 180. When so mounted bevel gear 185 meshes with bevel gear 190 so that a complete gear train drive is established from gear 174 through gears 182, 183, 184, 185, 190, 191, 193, 194, to 231 to thereby drive the pick-up disc 229.

As shown in Figures 12 and 18, a U-shaped arm 240 is mounted for limited pivotal movement upon a shaft 241 which is received at either end in coaxial holes 214 in ears 213. An arcuate shaped pressure pad 243 has welded to it a U-shaped bracket 242 which is pivotally secured to the arm 240 near its closed end for relative pivot movement with respect thereto, by means of shaft 244. One or more slender wire springs 245 have one end coiled about the shaft 244 and the other end bears against shaft 241 to spring bias the pressure pad 243 against the pick-up disc 229. Baffle plate 246 is secured by any suitable means to the wall 217 and is so shaped to closely conform to the shape of the adjacent edge of pressure pad 243. The pressure pad 243 and baffle 246 therefore form a closed channel whereby the coins are guided into the coin slot 215 (Figure 11) after leaving the gauging mechanism which will be described later herein.

Figure 13:
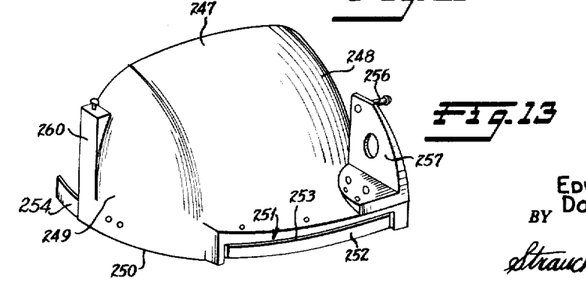
Figure 13 is a perspective view of the coin hopper.

A coin hopper 247 (Figures 13 and 18) with disc walls 248 and 249 is mounted for pivoted motion between the curved wall 219 and wall 217 (Figures 11 and 12). Referring to Figure 13, the lower edge 250 of hopper 247 therefor is recessed as shown at 251. Contact block 252 is secured within recess but is electrically insulated from the body of the hopper by means of an insulating strip 253. The thickness of the block 252 is such that when it is secured within recess 251, the plane of its lower surface does not coincide with the plane of the lower edge 250 but is instead a few thousandths of an inch higher. The inside surface of the block 252 is of the same curvature and constitutes substantially a continuation of the inside surface of the hopper (see Figure 18). When the hopper 247 is in its normal position, as shown in Figure 18, its lower edge 250 rests on a peripheral portion of the disc plate 224 since the pick-up disc 229 is of a smaller diameter than the disc plate 224. However, because the lower edge of the block 252 is slightly higher than the lower edge 250 of the hopper 247, there will be no physical contact between the disc plate 224 and the block 252.

Secured to the inner surface of side wall 249, adjacent to lower edge 250, is a leaf spring 254 of such a curvature that the free end thereof extends over the peripheral portion of disc plate 224 which is defined by the respective edges of pick-up disc 229 and disc plate 224.

A dump lever 255 is pivotally mounted on the side of the counter unit 120 (Figures 1 and 18), the end of which is connected by any suitable linkage to a pin 256 (Figures 13 and 18) which is rigidly secured to a bracket 257 which in turn is rigidly mounted on hopper 247. A tension spring 258 extends between the pin 256 to the bottom of the wall 217 of base plate 186 (Figure 11) to bias the hopper so that in its normal position, the lower edge 251 is in abutting contact against the lower peripheral portion of the disc plate 224. A similar spring 259 extends between a boss 260 on hopper 247, to the lower end of curved wall 219 (Figure 11) which reenforces the tension of spring 258. It will easily be seen from the foregoing that when the lever 255 is pressed, the hopper 247 will be pivoted, thereby displacing the lower edge 250 away from the disc plate 224 to allow any coins held between the hopper and disc plate to drop into a mutilated coin receptacle 261 mounted to frame 51 beneath hopper 247 (Figure 18).

An L-shaped slide 262 (Figures 12 and 18) has an elongated slot 263 cut therein and a post 264 rigidly secured thereto adjacent the end opposite its short leg. A guide pin 265, secured to frame portion 207 of base plate 186, extends through slot 263 to act as a guide for the slide 262. A spring steel rejector 266 is secured to the short leg of the slide 262 and has a curvature approximately the curvature of the periphery of pick-up plate 229. A spring 267 has one end secured to the post 264 and the other end secured to the pin 265 to normally force the rejector 266 against the periphery of pick-up disc 229.

Referring again to Figures 10, 11, 12 and 18, one end of a roller gauge arm 268 is pivotally secured to the back of wall 212 of base plate 186 by means of a pivot pin 269. A gauge roller 270 is journalled for rotary movement on a stud 271 which is in turn rigidly secured to arm 268. The free end of arm 268 has a slot 272 (Figure 10) and is received between two walls of a guide 273 which is secured to the back of the frame portion 207 of base plate 186 by means of screws 274. Screws 274 extend through the slot 272 and serve as stops to limit the movement of the free end of arm in 268 in guide 273.

The roller 270 is mounted on arm 268 in such a position that when the arm is in its normal position, the roller 270 projects into a semi-circular recess 275 in the periphery of disc plate 224 (see Figures 11 and 12). In such a position, the circular edge of the pick-up disc 229 will extend into a circumferential groove 276 cut in the periphery of the roller 270.

Rotatably mounted on a shaft received in coaxial bores 210 in ears 209 of frame portion 207 is a pivot link 277 (Figures 11 and 12) on either end of which are oppositely extending arms 278 and 279. Extending from the free end of arm 268 (Figure 10) is an ear 280 which is connected with the arm 278 for pivotal movement relative thereto by means of pin and roller bearing 281.

Figures 14, 15, 17:
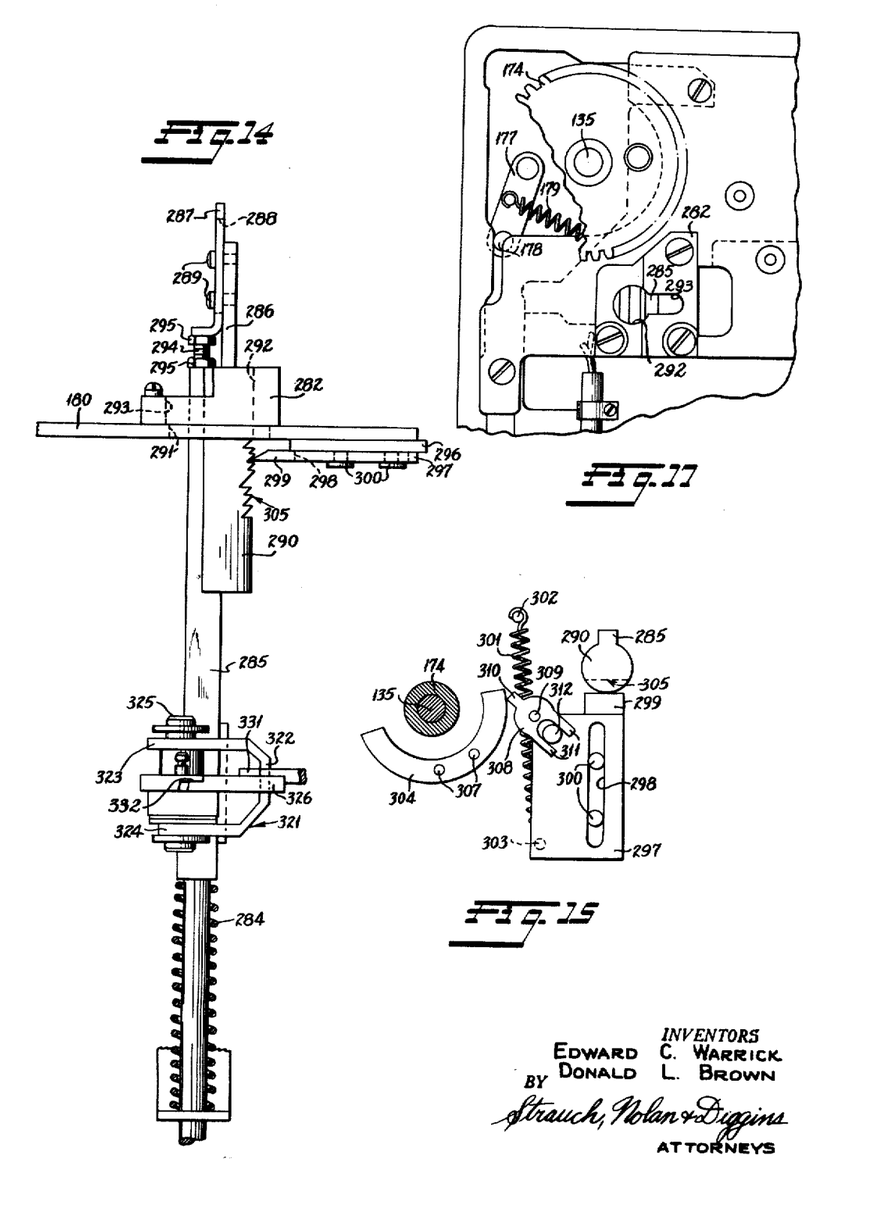
Figure 14 is a side elevation of the gauge rack and cam assembly.
Figure 15 is a plan view of gauge rack holding and trip mechanism.
Figure 17 is a top view of a portion of the mechanism shown in Figure 16.

Shown in enlarged detail in Figure 14 is an assembly that is mounted in the internal frame 51 of the machine for reciprocating vertical movement under the influence of the arm 279 and a return spring 284. This assembly includes an elongated square rod 285 having an extension member 286 on the upper portion of its length. An L-shaped abutment 287 has a slot 288 and is adjustably secured to the extension member 286 by means of screws 289 which extend through slot 288 and thereby permit vertical adjustment of abutment 287 relative to the extension member 286. A stop screw 294 is threaded into a boss 282 which is secured to the top plate 180 directly beneath the frame portion 207 of base plate 186 by means of screws 283. Stop screw 294 is locked in adjusted position by means of nuts 295 and serves as a positive stop for abutment 287.

As shown in Figures 14 and 15, the rod 285 on its upper end has an integral round barrel portion 290 which extends through an opening 291 in top plate 180 and is received for reciprocating movement within a bore 292 extending through the boss 282. A slot 293 is also milled through the boss 282, one end of which opens into bore 292. The upper rectangular portion of the rod 285, adjacent to barrel portion 290 is free to reciprocate within slot 293.

Along its length on one side thereof, the barrel portion 290 of rod 285 has a series of notches generally indicated at 305 and having horizontal lands. The distance between successive lands varies to correspond with the size of the coin being gauged as will become apparent. Shown best in Figures 14 and 15, a guide plate 296 is secured to the underside of top plate 180 adjacent to the barrel portion 290 of rod 285. A stop plate 297 has a slot 298 cut longitudinally therein. One end of stop plate 297 has a projecting lip 299 which is contoured to fit into any one of the notches 305 in barrel portion 290. The stop plate is reciprocally mounted on the bottom of guide plate 296 by means of guide pins 300 which extend through the slot 298 and which are press fitted into suitable holes in guide plate 296 in assembly. A spring 301 extends between posts 302 and 303, depending respectively from the underside of the plate 180 and stop plate 297 to urge the lip 299 into engagement with one of the notches 305 in barrel portion 290 as the rod 285 is positioned by the coin gauging mechanism.

A semi-circular shaped cam 304 is rigidly mounted by means of posts 307 on and depends from the bottomside of the gear 174 (Figures 5 and 15). The top plate 180 has a cut-away portion at 306 to permit mounting of the cam 304. A lever 308 is pivoted on a pin 309 depending from the bottom of top plate 180. Projecting from the periphery of lever 308 is an ear 310 and in diametrically opposed relation thereto, two legs 311 extend from the periphery of said lever, to form a recess for the reception of a post 312 rigidly mounted on the stop plate 297. As the shaft 135 rotates, the cam 304 contacts the ear 310 causing the lever 308 to rotate, thereby disengaging the lip 299 from the toothed section 305 of rod 285, against the tension of spring 301. It should be noted that the cam 304 will maintain disengagement of the lip 299 for approximately one-half a revolution of the shaft 135 and gear 174. This is to establish a timed relation between the coin gauging mechanism described above and fare registering mechanism as will become apparent.

*Coin and token registering mechanism*

Secured to the square rod 285 as by rivets 320 (Figure 20) is a bracket member 321 that includes a vertical element 322 from which protrude a pair of spaced parallel horizontal legs 323 and 324 (Figures 14 and 20) through which passes a vertical pin 325 that provides a pivot for a lever 326. Another lever 328 having a leg 327 and an opposite leg (Figure 20) is pivoted about a vertical shaft 329 and is also vertically slidable upon the shaft 329. The lever 326 and the opposite leg of the other lever are connected by a tension spring 330 that resiliently urges both said elements against the cam 173 at points spaced substantially 180 degrees apart, as best shown in Figure 20. The bracket member 321, secured to the square rod 285, moves vertically with the aforesaid rod in accordance with the diameter of the coin being gauged. The other lever, slidable on shaft 329 moves vertically with the square rod 285 by reason of the fact that its leg 327 is engaged in a horizontal slot 331 in the vertical element 322 of the bracket member 321.

The normal position of the lever 326 and of the lever on shaft 329 is as shown in Figure 20, this position occurring before a cycle of operation of the gear 174 and the coin singling machine. The cam 173, carried by the driven shaft 135 rotates counterclockwise as viewed in Figure 20, and as a consequence it first rotates lever 326 clockwise, and then lever 328 counterclockwise, against the force of spring 330, during one revolution of the driven shaft 135. This will occur no matter what the vertical position of the square rod 285 because the cam 173 is elongated along the axis of the driven shaft 135 as best shown in Figure 5.

Figure 19:
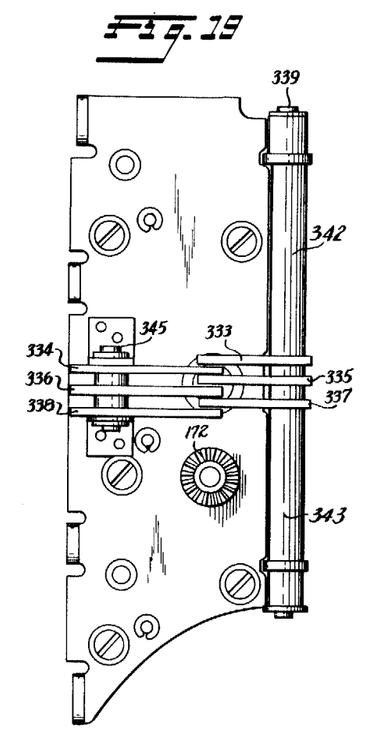
Figure 19 is a side view of the counter mechanism shown in Figure 9, showing the various counter operating levers.

The outer end of lever 326, on the opposite edge from that engaging the cam 173, is narrowed to provide a lip 332 that selectively engages and depresses one of six levers 333–338 (Figures 9 and 19) of the register mechanism to effect the totalization of either coins, tokens or the like that are being gauged. Levers 333, 335 and 337 are pivoted upon an elongated pin 339. The lever 335 effects the registration of pennies into the central or coin counter 340 (Figure 9) visible through window 116. The upper lever 333 when depressed, actuates the upper, or small token register 341 in the same manner to register and add small tokens, the lever 333 being integral with tube 342 mounted on elongated pin 339. In a similar manner, tube 343 is integral with lever 337 and when lever 337 is depressed by the lip 332 on lever 326, the lower or large token register 344, is actuated to total the large tokens that are gauged and sorted. A detailed description of the manner in which the counters 341, 340 and 344 are actuated by levers 333, 335 and 337, is contained in United States Patent No. 2,685,406 (see Figures 29–32 therein) and as the structure shown and described therein is identical to that in the present application, it is believed unnecessary to repeat a detailed description herein.

The registration of dimes, nickels and quarters into the coin counter 340 is accomplished by the selective depression of levers 334, 336, or 338, all pivoted upon a single pin 345, in combination with the rotation of bevel gear 172, driven by the large bevel gear 171 on the driven shaft 135. Since the large gear 171 will rotate through one revolution for each rotation of the driven shaft 135, the small gear 172 will rotate a greater number of revolutions. The bevel pinion 172 driven by gear 171 normally idles and has no effect on the counter 340 except when any one of the levers 334, 336 and 338 are depressed by lever 332. When the lever 334 is depressed, the rotation of bevel pinion 172 actuates counter 340 to register an additional ten cents to the sum appearing on the counter. Similarly, when the lever 336 is depressed, the rotation of bevel pinion 172 actuates counter 340 to add an amount of five cents to the sum appearing on the counter. In like manner, when the lever 338 is depressed, rotation of the bevel pinion 172 actuates counter 340 to add an amount of twenty-five cents to the sum appearing on the counter. The manner in which the bevel pinion 172 actuates the counters for the various coins in the present fare box is identical to that utilized in the fare box disclosed in United States Patent No. 2,685,406 referred to above (see Figures 33 and 34 and attendant description therein) and it is therefore believed unnecessary to repeat a detailed description herein.

It should be apparent that the complete depression of the selected lever 333–338 by the cam 173 and the lever 332 (Figure 20) occurs approximately during the first 180 degrees rotation of the driven shaft 135. As the shaft 135 continues the remainder of its 360 degree rotation to return the cam 173 to the position shown in Figure 20, the cam 173 moves the lever 328 counterclockwise to the limit of its movement and then releases it to snap back to its initial position under the influence of spring 320. This happens irrespective of the height of the lever 328 at the time, as determined by the diameter of the coin or token that has just been gauged, sorted and registered. This is true since as shown in Figure 5 the cam 173 is elongated along its axis and the construction of lever 356 is such that the lever 328 will bear against cam 173 and lever 356 in all adjusted positions of the lever 328 provided a coin has been gauged.

Figure 16:
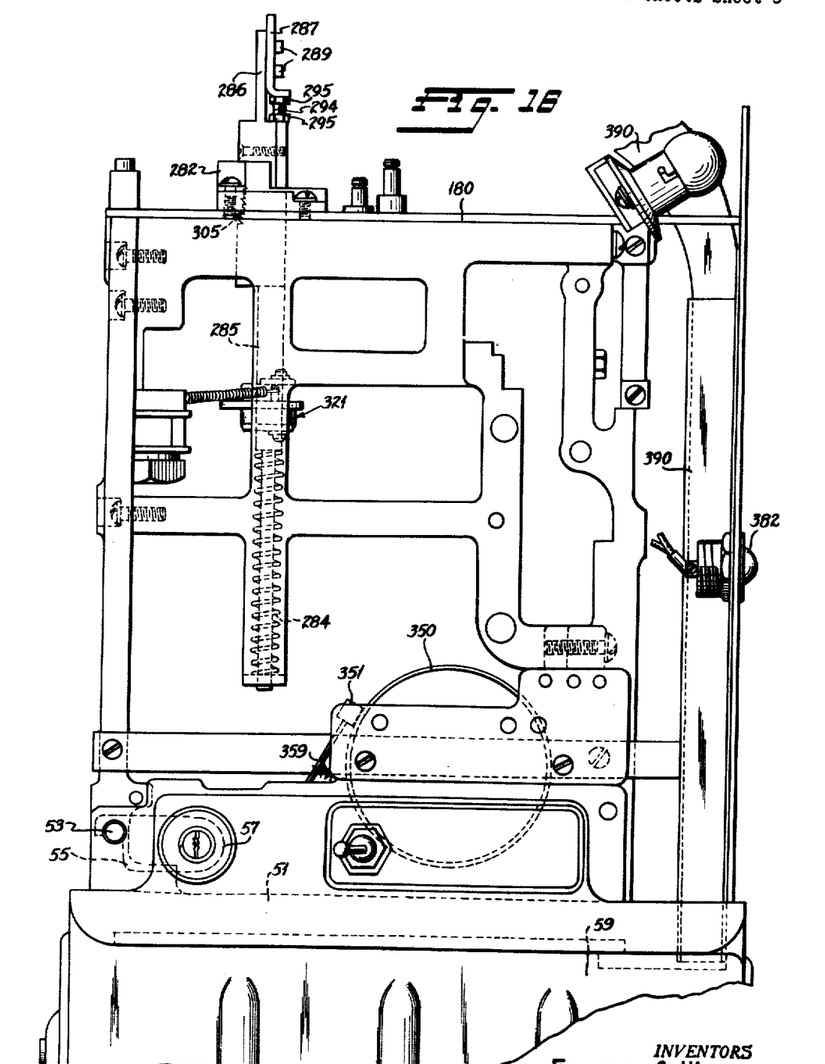
Figure 16 is an elevation of the internal frame structure looking from the right in Figure 15.

As shown in Figure 16, a bell or gong identified by the reference number 350 is sounded by the clapper 351. This clapper is attached to the leg of bell crank 352 that is connected by a pin to the lower end of a vertical pull rod 353 (Figure 5) secured at its upper end to a bell crank 354 moving in a vertical plane about a horizontal pivot shaft 355 (Figure 5).

As shown in Figure 5, there is a lever 356 pivoted about a vertical shaft 357. Lever 356 is made up of an upper and lower plate respectively numbered 356a and 356b which are rigidly secured together by a pin 356c. As viewed in Figure 5, the left leg of the bell crank 356 is in the path of movement of a projecting lip 358 (Figure 20) on the opposite leg of the vertical shiftable lever 328 on shaft 329. Regardless of the vertical position of the lever 328 resulting from coin gauging, the projecting lip 358 under the action of cam 173 will engage the pin 356c of lever 356 and move the lever 356 to the right in Figure 20 and then release it, causing the clapper 351 to strike the bell 350 under the influence of spring 359. The coin gauging mechanism described above controls the vertical position of the rod 285 in such a manner that only in the event a coin has been gauged will the lever 328 be in contact with the cam 173 or lever 356. The bell 350 will therefore indicate by its sound the fact that a coin or token has just been gauged, sorted and registered. If no coin or token has been gauged the vertical position of the rod 285 and lever 328 will be above and out of contact with the rotating cam 173 and lever 356 in which case the bell will not be rung.

From the foregoing description, it will be apparent to those skilled in the art that our gauging, registering and totalizing mechanism may be readily adapted for various other uses in gauging and sorting.

As shown in dotted lines in Figure 12, a normally closed switch 370 is secured to the back of base plate 186 by means of screws 378. The switch is actuated by means of a plunger 371. Pivotally mounted to one end of the switch 370 is a lever arm 372 which carries a roller assembly 373 at its free end and which, upon pivoted motion about its fixed end, will depress the plunger 371 to actuate or open the normally closed switch 370.

A bell crank 374, having projections 375 and 376 is pivoted to the back of the base plate 186 by means of pivot pin 379. Projection 375 bears against the roller assembly 373 and as the bell crank 374 is pivoted about point 379, projection 375 bears against roller assembly 373 to pivot the arm 372, thereby depressing plunger 371 and opening the normally closed switch 370. Projection 376 extends over gear 231 and into the circular path of a pin 377 which is secured to the back of gear 231. It can be seen that as the gear 231 rotates in a clockwise direction, once every revolution thereof, the pin 377 will contact the projection 376, causing the bell crank 374 to pivot and thereby open the normally closed switch 370.

Having described the various elements of the improved fare box and their functions, the operation of the entire fare box will now be described. With particular reference to Figures 1, 2 and 3, the fare in the form of tokens or coins are dropped into the coin receiving member 71 and pass through the slot 76 onto the baffle 80 from which they drop down to the disc 85 and trap door 89 for visual inspection by the operator. The operator then depresses the lever 103 to tilt the disc 85 and trap door 89 allowing the coins to drop through the chute 104 into the hopper 247 (Figure 18) of the coin singling mechanism. As explained previously, if the operator neglects to manually dump the coins by means of lever 103, as the coins and tokens accumulate, their weight will overcome the tension of spring 93, thereby automatically opening the trap door 89 (Figure 4) and allow the fares to fall into the hopper 247.

Since the coin singling mechanism is mounted at an angle relative to the other elements of the fare box, the coins will fall to the bottom of the hopper 247 where its bottom edge 250 abuts against the disc plate 224. The grounded lead from the source of power is connected to the disc plate 224. Another lead extends from the block 252 (Figure 13) to one terminal of switch 370 (Figure 12), the other terminal being connected to the motor 130. The high side of the line from the source of power is connected directly to the motor 130 to complete the power circuit to the motor. However, since as explained above, the block 252 does not contact the disc plate 224, and is insulated from the hopper by means of insulating strip 253, the grounded line from the source of power to the motor is interrupted.

As the coins drop into the bottom of the hopper 247, they will lay flat against the lower marginal portion of the disc plate 224 with their edges abutting against the block 252. The air gap between the block 252 is sufficiently small so that the thickness of the thinnest coin or token to be handled by the box will bridge the air gap to complete the circuit from the source of power to the motor thereby starting motor and driving the elements of the box through at least one cycle of operation as will be explained.

It should be explained at this point that one cycle of operation of the box will drive the pick-up disc 229 one complete revolution after which the circuit to the motor will be interrupted to stop the motor unless coins still remain in the bottom of the hopper 247 in which case the unit will keep cycling until all coins are removed therefrom by the pick-up plate.

When the motor is energized, it drives the shaft 132 (Figure 6) through the reduction gear 131. Since the disc 138 rotates with shaft 132 and is free to rotate relative to shaft 135, the drive is transmitted from shaft 132 to shaft 135 by means of lever arm 161, spring 164 and roller 167 to disc 169 which is secured to shaft 135 (Figure 8). The gear 174 (Figure 5), being mounted for rotation with shaft 135, the drive is transmitted through gears 182, 183, 184, 185, 190, 191, 193, 194, and 231 (Figures 10, 11 and 12) to rotate the pick-up disc 229. As the disc 229 rotates in hopper 247 (Figure 18), coins or tokens are caught in recesses 230. The recesses are of such a depth that they are large enough to accommodate the largest coin or token and will still pick up the smallest coin which is put through the box. The diameter of the pick-up disc is such that the smallest coin will extend a substantial amount into the recesses 230.

As the coins are picked up in recesses 230 (the inner surface of the hopper 247 insures that coins of the smallest diameter to be handled will project into recesses 230), they are guided by the inner surface of the hopper 247 along the marginal portion of the disc plate 224. As the coins are carried around the periphery of the disc plate, a leaf spring 254 bears against each coin and forces it against the inner edge of the recesses to condition the coins for presentation to the rejector 266 (Figures 12 and 18). The rejector 266 has a serrated portion 266a along its lower edge (Figure 21). Since the rejector is urged toward the pick-up disc 229 under the influence of spring 267, the edges of the coins will contact the serrated portion 266a along the length of the rejector 266 and cause the coins to rotate in the recesses 230. If mutilated or bent coins are dropped into the box, they will in most cases be picked up by the pick-up disc 229. However, as they are rotated in the recesses 230 by the serrated portion of the rejector, the bent and mutilated portions of the coins are presented to the thin edge of the recesses 230. The edges of the recesses are of such a thickness that in the case of any coin or token which is bent or mutilated sufficiently to cause jamming of the box, the bent or mutilated portion thereof will extend above the edge of the recesses and will be pushed out of the recesses under the pressure exerted by the rejector and fall back into the hopper 247. It follows therefore that the thin edge of recess 230 must be of the same or less thickness than that of the thinnest coin or token contemplated to be used, so any bent or mutilated edge of the coin or token will be disposed above the thin recess edge. This prevents jamming of the box by mutilated or bent coins and tokens.

As the coins pass from the rejector 266, they are fed to the coin gauging mechanism (see Figures 12, 14 and 18). As previously explained, the arm 268 and roller 270 are biased downwardly toward disc plate 224 by the spring 284 (Figure 14) through the medium of rod 285, bracket 287, arm 279 (Figure 10), sleeve 277, arm 278 and roller pivot 281. As the coins are fed under the roller 270, the arm 268 pivots about the stud 269 an amount, determined by the diameter of the coin or token being gauged. Through the aforementioned linkage system, the rod 285 (Figure 14) will be depressed an amount dependent upon the diameter of the coin or token, the rod being held in the gauged position by the lip 299 of the spring urged stop plate 297. The coin then passes under the arcuate plate 243 (Figures 12 and 18) and into the slot 215 which guides the coins and tokens into a coin chute 390 (Figure 16) which in turn channels the coins into the vault 59 such as is disclosed in United States Patent No. 2,773,640. The arcuate plate 243 has on its underside an integral tip 380. In cases where coins are wet or coated with some sticky substance, there will be a tendency for the coins to stick to the plate 243. The tip 380 prevents this by breaking the adhesion between the coin and the underside of the plate 243.

The rod 285 now being gauged in a vertical position corresponding to the coin diameter, the lever 326 (Figures 14 and 20) is thereby positioned adjacent to the appropriate counter lever (Figure 19) to register on the counters 340, 341 or 344, the coin or token being gauged. Thus if a nickel, dime or quarter has been fed to the roller 270, the arm 268 will position the rod 285 and lever 362 opposite respectively either one of the levers 336, 334 or 338. Since the shaft 135 is being driven by the motor, the cam 173 during its rotation on shaft 135 will cause the lever 326 to selectively depress one of the levers 336, 334 or 338 and the gear 171 will drive bevel gear 172 to effect registration on counter 340 of the coin being gauged. In the case of tokens or pennies, simply depressing lever 335 (pennies), 332 or 337 (tokens) will cause the count on the counters 340, 341 or 344 to increase by one unit.

It should be explained at this point that the gear drive from the shaft 135 to the pick-up disc 229 reduces the rate of movement thereof to one-quarter of that of shaft 135. In other words, one revolution of the shaft 135 will result in one-quarter of a revolution of pick-up disc 229. The shaft 135 and the elements carried thereon have a "home" position which bears a certain definite relation to the other elements in the box before the start of each cycle. The shaft 135 is located in its home position by means of the cam follower 176, lever 177 (Figure 5) and spring 179. The disc 175 has a gradually sloping recess 175a in its periphery into which the cam follower 176 is urged by spring 179 when the shaft 135 is in its home position. The slope of recess 175a and tension of spring 179 is such that it will not prevent shaft 135 from rotating under the drive from the motor 130 but insures that the shaft 135 and the various elements mounted thereon will stop at the home position when the motor is deenergized. The home position of the cam 173 and lever 326 at the start of each cycle is as shown in Figure 20. One complete cycle of operation consists of one complete revolution of the pick-up disc 229 or four revolutions of the shaft 135. At the beginning of each cycle of operation, the pin 377 (Figure 12) will bear against the lever 374 to open the switch 370. As mentioned above, the reception of coins in the hopper 247 will complete a circuit to the motor 131 around the open switch 370. As the pick-up disc 229 is rotated by the motor, the pin 377 will rotate with it and allow the switch 370 to close to maintain a circuit to the motor regardless of the presence or absence of the coins in the hopper 247. The motor will then continue to run until the pin 377 has made one complete revolution at which point it will again contact the lever 374 to open the motor circuit provided all the coins have been removed from the hopper by the pick-up disc. If, after one complete revolution of the pick-up disc, coins or tokens remain in the hopper, the fare box will continue to cycle until all coins are removed and the pick-up disc has returned to its home position. In no case will the mechanism stop cycling before the pick-up disc is in its home position.

As the cam 173 rotates in a counterclockwise direction away from its home position, as shown in Figure 20 its raised portion will move lever 326, causing it to depress any one of the levers 333, 338 to make the proper registration on the counters 340, 341 and 344, depending upon the coin or token diameter. Continued rotation of the cam 173 will bring its raised portion into contact with lever 328 causing it to rotate above the shaft 357 and through the system of bell cranks and rods 354, 353 and 352 (Figure 5) causes the clapper 351 (Figure 16) to ring the bell 350. Since the shaft 135 will rotate once for every quarter revolution of the pick-up disc 229, and since the coin carrying recesses 230 are spaced 90 degrees apart, the bell will ring once for each coin or token that is gauged and registered. When the shaft 135 is in its home position, the cam 304 (Figure 15) abuts against the ear 310 of lever 308 at a point approximately midway along its circumference and therefore holds the lip 299 out of engagement with the teeth 305 until the gauging mechanism has set the rod 285 and lever 326 at the proper position at which point continued rotation of the shaft 135 disengages cam 304 from the ear 310 to allow the lip 229 to engage the toothed section 305. The leading edge of the cam 304 is directly above the raised portion of the cam 173 so that the ear 310 will be engaged to retract the lip 299 allowing the rod 285 and the arm 268 and roller 270 to return to their normal position simultaneously as the bell 350 is rung.

To insure that the pick-up disc is completely effective in picking up coins from the hopper and to insure that each recess in the pick-up disc carries a coin from the hopper, it is desirable that the pick-up disc hesitate momentarily once every 90 degrees when the recess is at the lowermost point of its travel through the hopper. This is accomplished by means of the crank arm 150 (Figure 5) in the following manner. Since the crank arm 150 urged upwardly by the spring 154, once during each revolution of shaft 135, it will engage the lip 139 on disc 138, and the cam follower 167 (Figure 8) will ride up out of depression 170 against the pressure of spring 164 to allow relative rotation between shafts 132 and 135 to momentarily interrupt the rotation of shaft 135 until one of the cams 158 (Figure 5) engages the pin 159 to disengage the arm 150 from the lip 139 thereby allowing the shaft 135 to continue its rotation. As explained above, the cams 158 are carried by shaft 132 and the clutch arrangement (Figures 7 and 8) on disc 138 permits relative rotation of the shafts 132 and 135. The three cams 158 are equidistantly spaced around the disc 157 so that the rotation of shaft 135 is never interrupted for more than one-third of a revolution of shaft 132. Since one revolution of the shaft 135 is equivalent to 90 degrees of rotation of pick-up disc 229, and since the rotation of the shaft 135 is interrupted once every revolution, the rotation of the pick-up disc will be momentarily interrupted every 90 degrees when the recess is near the bottom of hopper 247.

The pick-up disc will keep cycling until all the coins are removed from the hopper. If mutilated coins are dropped into the box, they will, as explained above, be rejected by the rejector, 266, in which case the mutilated coins will keep dropping out of the recesses 230 back into the hopper. This will cause the box to keep cycling although no coins are being gauged or registered after all the good coins have been removed from the hopper. This condition is apparent to the operator due to the fact that the box keeps cycling without ringing the bell 350. When this is noticed, the operator can depress the lever 255 (Figures 1 and 18) to allow the mutilated coins to drop into a receptacle 261 located directly beneath the hopper 247. The motor 130 will then continue to run until the pin 377 causes the lever 374 to open switch 370. At this point, since there are no coins to establish contact between disc plate 224 and bar 252 (Figures 12, 13 and 18) all circuits to the motor will be opened and the box will stop cycling.

In the event no mutilated coins are dropped into the hopper, at least one coin may be left in one of the recesses closest to the pin 377 (Figure 12) at the completion of a cycle. In other words, the last coin may have been picked up by a recess and sufficiently removed from the bottom of the hopper to break the contact between the disc plate 224 and bar 252, when the pin 377 opens the switch 370 before the coin has been gauged, registered and dropped through the coin chute into the vault. Normally, this condition is of no consequence since the coins and tokens in the vault will still correspond with the amount registered on counters 340, 341 and 344. However, if the operator wishes to clear the machine before going off duty, a push button 382 (Figure 1) is provided which will complete a circuit from the power source to the motor, shunting the air gap between the disc plate 224 and bar 252, and the switch 370, which will initiate another complete cycle of the box and thereby clear it of all coins or tokens.

In the appended claims, the term "fare" is used to define coins, tokens or the like used in the payment of fares, and other objects which it may be desired to register or count with our improved mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fare handling device, a fixed base plate; a movable element mounted adjacent said plate and having recesses along one edge to receive fares, the edges of said recesses being of such thickness that bent and mutilated portions of mutilated fares extend above the top surface of the recess edges; a device for ejecting bent or mutilated fares from said recesses comprising a body having a surface facing the recessed edge of said element, said surface having a large coefficient of friction with fares in the recesses of said movable element, and said body being so constructed and arranged as to resiliently press fares against said recesses and rotate them in the plane of said movable element, whereby deformed fares will cooperate with said recess edges and be ejected from said recesses during movement of said movable element in one direction.

2. In the device described in claim 1, said body having a surface with a large coefficient of friction being in the form of a leaf spring, and said surface being serrated to have a large coefficient of friction.

3. In a fare handling and registering device; a fixed base plate; a movable element mounted adjacent said plate and having thin edge recesses along one edge to receive fares; a device for ejecting fares from said recesses comprising a body having a surface facing the recessed edge of said element, said surface having a large coefficient of friction adapted to engage the circumferential periphery of fares in the recesses of said movable element; means resiliently urging said body toward the edge of said movable element so as to press fares against the thin edge of said recesses and rotate them in the plane of said movable element, whereby deformed fares will be ejected from said recesses during movement of said movable element in one direction; means for removing ejected fares; fare gauging means beyond the end of said ejecting means; and register means controlled by said fare gauging means to total the value of fares that pass through the gauging means.

4. In an electric motor driven fare box, a fixed plate and a movable wall forming with said plate a fare receptacle; a movable singling device parallel to said fixed plate and driven by said motor; an electric circuit including the motor and a first normally closed switch for driving said singling device through at least one cycle once the motor is energized, said fixed plate and movable wall forming a second open switch in said circuit in parallel with said first switch, and operable to be closed by a metallic fare contacting them, said movable wall being shiftable to a second position for discharging fares from the receptacle in which second position a metallic fare will not close the electric circuit.

5. In an electric motor driven fare box, a fare receptacle; a gauging device; a rotatable endless singling device driven by said motor and cooperating with said receptacle and having a series of equally spaced recesses for receiving and singling fares through and past said gauging device during the cycle of operation; an electric circuit including said motor and first and second control switches in parallel for driving said singling device, said first switch being biased toward closed position and normally maintained in open position by said singling device only at the end of a cycle of operation; a second normally open switch in said circuit in parallel with said first switch, and operable to be closed by a metallic fare in said receptacle.

6. In the device described in claim 5, the drive between said electric motor and said singling device including a motor drive shaft with a disengageable clutch, and means for disengaging said clutch once for each revolution of said motor shaft; and a gear train drive from said clutch to said singling device such that the speed of rotation of said singling device to that of the motor drive shaft is the reciprocal of the number of recesses in said singling device.

7. In the device described in claim 6, said singling dedive including a plate inclined to the horizontal, and a wall member cooperating with the singling device at the lower portion thereof, said disengageable clutch being operative to disconnect the motor drive shaft from said singling device each time that one of the recesses in said singling device is adjacent the lowermost point in its cycle.

8. In the device described in claim 7, a signal actuated in response to said gauging device; and means preventing the passage of mutilated fares through said gauging device, whereby the presence of only mutilated fares in said receptacle will cause continued energization of said electric motor without actuation of said signal device.

9. A fare handling and register device comprising: a fixed base plate; a movable element mounted adjacent said plate and having recesses along one edge to receive fares; a device for ejecting deformed fares from said recesses comprising a body having a high coefficient frictional surface facing the recessed edge of said element and engaging the circumferential periphery of fares disposed in the recesses of said movable element; means resiliently urging said body toward the edge of said movable element so as to press fares against the walls of said recesses and rotate them in the plane of said movable element, whereby deformed fares will be ejected from said recesses during movement of said movable element in one direction; a fare gauging means disposed adjacent said movable element beyond said ejecting means for gauging the diameter of a fare in each of said recesses; means disposed adjacent said movable element beyond said fare gauging means for ejecting gauged fares from said recesses; and register means controlled by said fare gauging means to total the value of fares that pass through said gauging means.

10. In a fare box having a support the improvement comprising: a singling device including a movable element mounted on said support and having recesses provided in its edge to receive single fares and move them from one position to another along said support, the edges of said recesses being at least as thin as the thinnest fare to be singled; a mutilated fare ejector means disposed on said support including an element with a surface having a large coefficient of friction biased toward said edge of said movable element and adapted to frictionally engage the periphery of fares in said recesses and press the fares against the thin recessed edges and rotate the fares upon movement of said element from one position to another to thereby cause ejection of mutilated fares from said recesses.

11. A fare box as defined in claim 10 wherein said mutilated fare ejector element is a flat spring having a plurality of fingers extending substantially transversely to and across the path of movement of said fares in said recesses, whereby fares in said recesses of said movable element will engage successively spring biased fingers to be thereby rotated as said movable element moves past said ejector means.

12. In a fare box; a fare singling and gauging device including a substantially planar disc rotatable in a non-horizontal plane and having a series of equally spaced recesses in its periphery each constituting a part of the gauging portion of said device and operable to receive single fares and move them through the gauging portion of said fare singling and gauging device; a base plate larger in diameter than said disc and located parallel to and below said disc to support fares engaged in the recesses of said rotatable disc; the gauging portion of said fare singling and gauging device comprising a gauging element mounted for movement in a plane co-planar with said co-planar disc, and means resiliently urging said element toward said rotatable disc; a pressure plate above said base plate in the region of said gauging element and operable to press fares against said base plate as they are moved past said gauging element by the recesses in said rotatable disc; a mutilated coin rejector comprising means forming a curved wall adjacent the periphery of said rotatable disc and perpendicular thereto, and having a serrated portion along its length and co-planar with said disc to frictionally engage the edges of the fares as they move past said rejector, so as to rotate the fares within the recesses with said disc, whereby said mutilated fares will be rejected from the recesses; and a movable hopper cooperating in its lowered position with said base plate and said disc to form a receptacle to receive fares to be singled and gauged.

13. In the device described in claim 12, means for raising said movable hopper away from said base plate to allow fares to slide off said base plate and disc, and a box cooperating with said hopper for receiving said fares.

14. In the device described in claim 13, an electric motor drive for said rotatable disc; and an electric circuit to said motor including said base plate and said hopper, there being a gap between said base plate and said hopper small enough to be closed by a metallic fare or coin to operate said motor when said hopper is down, said gap being too large to be closed by a fare or token when said hopper is raised, whereby the circuit to said motor is opened when said hopper is raised.

15. In a fare box; a fare singling and gauging device including a substantially planar disc rotatable in a non-horizontal plane and having a series of equally spaced recesses in its periphery each constituting a part of the gauging portion of said device during a portion of disc rotation and operable to receive single fares and move them through the gauging portion of said fare singling and gauging device; a base plate larger in diameter than said disc and located parallel to and below said disc to support fares engaged in the recesses of said rotatable disc; and a movable hopper cooperating in its lowered position with said base plate and disc to form a receptacle to receive fares to be singled and gauged; an electric motor drive for said rotatable disc; and an electric circuit to said motor including said base plate and said hopper, there being a non-conductive gap between said base plate and said hopper small enough to be conductively closed by a metallic fare or coin to operate said motor when said hopper is down, said gap being too large to be closed by a fare or coin when said hopper is raised, whereby the circuit to said motor is open when said hopper is raised.

References Cited in the file of this patent
UNITED STATES PATENTS

| | | |
|---|---|---|
| 1,096,172 | Johnson | May 12, 1914 |
| 1,850,148 | Brandt | Mar 22, 1932 |
| 1,902,328 | Howenstine | Mar. 21, 1933 |
| 1,947,456 | Bock | Feb. 20, 1934 |
| 2,110,014 | Donnellan | Mar. 1, 1939 |
| 2,163,351 | Paul | June 20, 1939 |
| 2,170,288 | Kiss | Aug. 22, 1939 |
| 2,423,502 | Jorgensen | July 8, 1947 |

FOREIGN PATENTS

| | | |
|---|---|---|
| 603,663 | Great Britain | June 21, 1948 |